Feb. 5, 1935. H. W. BELL 1,989,733
VEHICLE
Filed March 29, 1932  2 Sheets-Sheet 1
Fig.1.
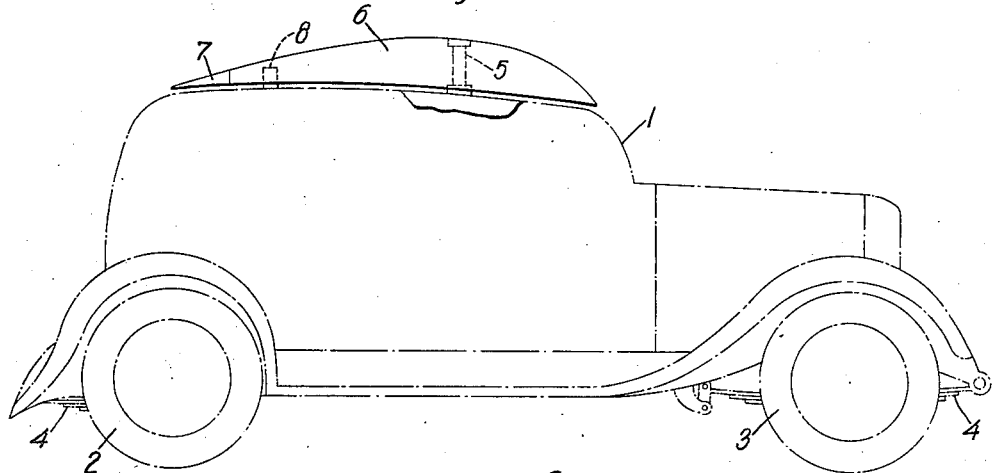
Fig.2.ª
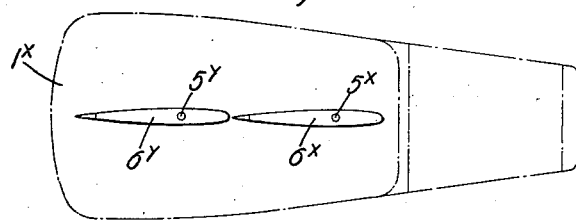
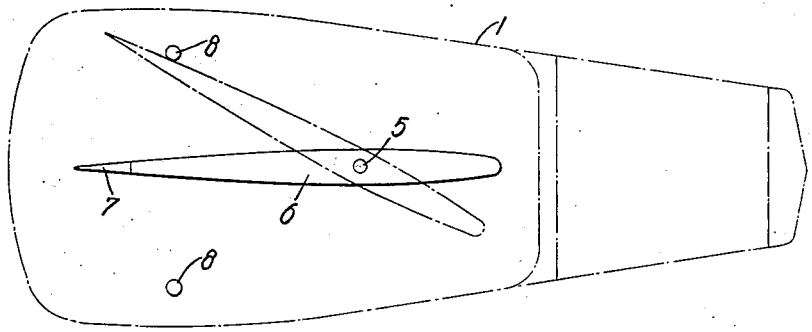
Fig.2.
INVENTOR
Harvey W. Bell.
BY Moses & Nolte
ATTORNEYS Feb. 5, 1935. H. W. BELL 1,989,733
VEHICLE
Filed March 29, 1932 2 Sheets—Sheet 2
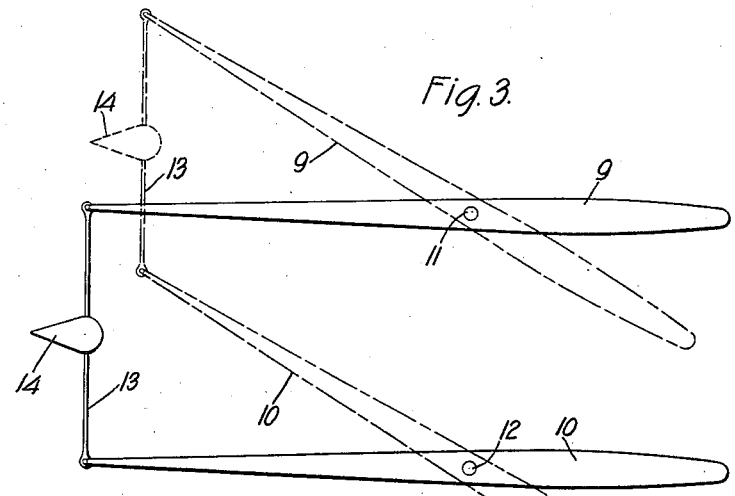
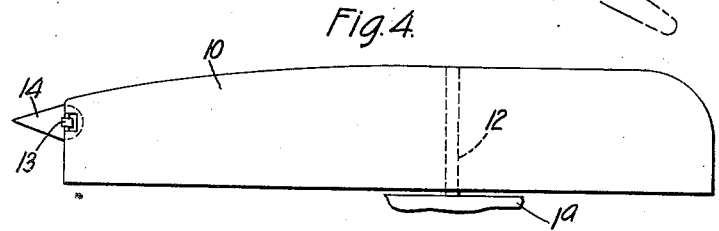
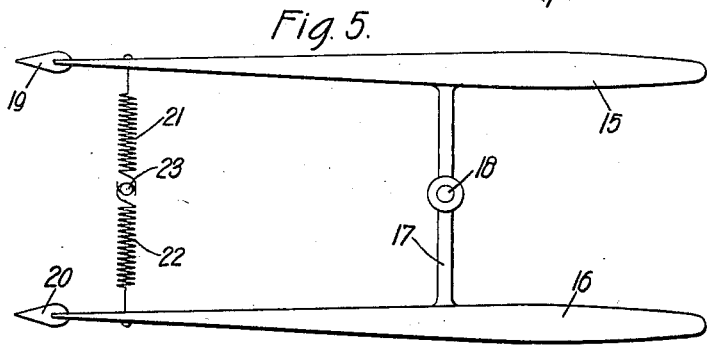
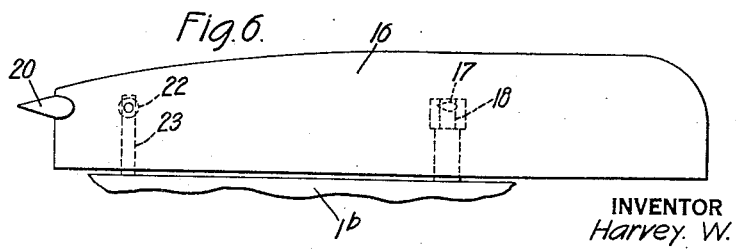
INVENTOR
Harvey. W. Bell.
BY *Moses & Nolte*
ATTORNEYS Patented Feb. 5, 1935

1,989,733

UNITED STATES PATENT OFFICE 1,989,733

VEHICLE

Harvey W. Bell, Ardsley-on-Hudson, N. Y.

Application March 29, 1932, Serial No. 601,731

10 Claims. (Cl. 280—150)

This invention relates to vehicles and is illustrated herein as applied to an automobile.

The invention has for an object to utilize the air resistance for applying to the vehicle a moment that opposes the centrifugal force acting on the vehicle when the vehicle rounds a turn at substantial speed. When a motor vehicle, for example an automobile, rounds a turn at high speed, the centrifugal force acting on the vehicle tends to increase the load upon the wheels at the outer side of the turn and to diminish the load upon the wheels at the inner side of the turn. This is conducive to skidding because of the unequal application of pressure between the wheels and the road. The danger is accentuated by the fact that the traction for driving or braking is rendered unequal.

There is also set up a pronounced, highly objectionable, and sometimes dangerous, tendency of the vehicle body to tilt toward the outer side of the turn due both to the unequal distortion of the springs at the opposite sides of the car and to the unequal compression of the tires.

The tires at the outer side of the turn are subjected to a substantially increased strain and hence to the risk of a blow-out, if they are weak. A blow-out occurring at the outer side of a vehicle which is rounding a turn at a high speed is very likely to result in collision or in the over-turning or ditching of the vehicle.

In accordance with the present invention, an extraneous force produced by the head wind is brought into play for opposing the centrifugal force acting on the vehicle. Since this force is produced by the head wind, it is related in magnitude to the speed of the vehicle and may be caused to neutralize substantially the centrifugal force acting on the vehicle itself.

In a preferred embodiment of the invention as illustrated herein, it is a feature that provision is made of a structure in the form of a vertical fin pivotally mounted on top of the vehicle and by centrifugal force operated into position to produce the neutralizing force referred to.

It is a further feature of the invention that the fin is mounted for free pivotal movement about a vertical axis, that the center of the force on the fin due to its forward movement through the air, hereinafter referred to as the center of air force, is located behind the vertical axis so that the fin normally points into the head wind, and that the center of mass of the fin is located behind the vertical axis so that the centrifugal force acting on the fin may operate, when the vehicle rounds a turn, to pivot the fin relatively to the vehicle in a direction such that the wind acting on it will set up a force, the direction of which is such as to tend to neutralize the centrifugal force which acts on the vehicle.

Other objects and advantages will hereinafter appear.

In the drawings forming part of this specification,

Figure 1 is a view in side elevation of an automobile embodying features of the invention;

Figure 2 is a plan view of the vehicle of Figure 1;

Figure 2a is a plan view of an automobile embodying a modified form of the invention;

Figure 3 is a plan view of a further modified form of aerofoil structure;

Figure 4 is a fragmentary side elevation showing the structure of Figure 3 applied to a motor vehicle;

Figure 5 is a plan view of a further modified form of aerofoil structure; and

Figure 6 is a fragmentary view in side elevation of the structure of Figure 5 applied to a motor vehicle.

In the embodiments of Figures 1 and 2, disclosure is made of a motor vehicle comprising a body 1, wheels 2 through which the vehicle is driven, and wheels 3 which are turned to steer the vehicle. The vehicle body is supported by springs 4. The vehicle may be of any usual construction, the parts thus far referred to being arranged in accordance with any usual and approved practice.

A pivot post 5 extends vertically upward from the top of the vehicle body and pivotally supports a stream-lined vertical fin 6. The fin is freely rotatable upon the pivot post 5, and although it extends for a substantial distance in advance of the pivot post, it extends far enough to the rear of the pivot post to have its center of air force disposed behind the pivot post. As a result of this arrangement the fin tends always to point into the head wind when the vehicle is travelling in a straight course. Thus if the vehicle travels at a speed of 80 miles per hour and a wind is blowing at a direction at right angles to the direction of the vehicle at a speed of 20 miles an hour, the fin will stand at an angle of approximately 14 degrees to the direction of travel of the vehicle. When the vehicle rounds a turn, however, the fin is subjected to the effect of centrifugal force. The center of mass of the fin is disposed behind the pivot post and hence the centrifugal force tends to carry the tail of the fin toward the outside of the turn. The desired distribution of weight may be secured by providing a weight 7 at the rear end of the fin.

The centrifugal force may at first readily overcome the force of the air tending to hold the fin pointed directly into the head wind, but the centrifugal force has a diminishing tendency to turn the fin about the pivot post 5 as the fin moves away from parallelism with the longitudinal axis of the machine, whereas the air pressure has an increasing tendency to resist such movement. The parts are desirably so designed that a state of equilibrium is reached when the fin has been turned through a sufficient angle to cause the air force on the fin to neutralize the centrifugal force acting upon and tending to tilt the vehicle body. When this condition is obtained, the body of the vehicle has no tendency to tilt. The parts may be so designed, however, as to produce an overneutralization and thereby to cause the vehicle body to tilt or bank toward the inner side of the turn, if desired. The fin is disposed to lie wholly within the longitudinal bounds of the vehicle body. Stops 8 are desirably provided as a matter of protection to preclude any possibility of the fin swinging outward beyond the lateral bounds of the vehicle body. These stops are unnecessary, however, if the fin is made of less length than the width of the vehicle body. The stops do not ordinarily come into play except when the vehicle travels slowly in a high cross wind or tail wind or stands parked with a cross wind blowing.

In the embodiment of Figure 2a the vehicle body 1x has mounted on the top thereof a plurality of fins 6x and 6y pivotally supported respectively on vertical posts 5x and 5y which are situated one behind the other. Each of the fins is made short enough to remain within the lateral and longitudinal bounds of the vehicle body in any position to which it may be turned. Hence no stops are necessary for limiting the angular range of movement of these fins. The posts 5x and 5y are situated substantially in the longitudinal central vertical plane of the vehicle and the fins are desirably so disposed longitudinally of the vehicle that the resultant of the forces which they apply to the vehicle body acts through a point substantially in vertical alignment with the center of mass of the body. As in the case of the fin 6 of Figures 1 and 2, each of the fins 6x and 6y has its center of mass and its center of air force disposed behind the pivot about which it turns.

In the embodiment disclosed in Figures 3 and 4, the structure of the invention comprises two spaced fins 9 and 10 which are mounted respectively upon vertical pivot posts 11 and 12 that extend upward from the top of the vehicle body 1a. The tail portions of the fins 9 and 10 are connected to one another and are constrained to move in parallelism by a cross link 13. The cross link 13 is of a length equal to the distance between the axes of the pivot pins 11 and 12. A weight 14, stream-lined in contour, is carried by the cross link 13 and causes the center of mass of the composite structure formed by the fins and the cross link to be disposed behind the axes of pivot pins 11 and 12. In this form of the invention as in the form already described, the center of air force of the aerofoil structure is disposed behind the pivot posts and the mode of operation is generally the same. The interconnection of the fins causes them to act co-ordinately to apply a moment to the body for counteracting the effect of the centrifugal force acting directly on the body.

In the form disclosed in Figures 5 and 6, the structure of the present invention comprises fins 15 and 16 disposed in parallel relation and rigidly connected by a cross bar 17. The cross bar 17 is pivotally mounted upon a pivot post 18 that extends vertically upward from the top of the vehicle body 1b. The fins 15 and 16 have weights 19 and 20, respectively, affixed to the rear ends thereof so that the center of mass of the structure is disposed behind the pivot post 18 as in the form of the invention heretofore described, the center of air force of the structure is located behind the axis about which the structure turns. In this form of the invention, provision is made of springs 21 and 22 connected, respectively, to the fins 15 and 16 and to a fixed post 23 for yieldingly urging the structure into parallelism with the longitudinal axis of the vehicle body and for yieldingly opposing movement of the structure away from such position with progressively increasing force. This feature is a desirable one for limiting the swinging movement of the structure and at the same time rendering the response of the vehicle to the structure substantially independent of the direction and velocity of any cross wind that may be blowing.

I have described what I believe to be the best embodiment of my invention. I do not wish, however, to be confined to the embodiment shown, but what I desire to cover by Letters Patent is set forth in the appended claims.

1. In a vehicle, the combination with a vehicle body and a vertical fin pivotally carried by the body and in a position exposed to the head wind for free swinging movement about a vertical axis, said fin having its center of air force and its center of mass both disposed to the rear of the vertical axis.

2. In a vehicle, the combination with steering mechanism, of a spring supported vehicle body and a vertical fin pivotally carried by the body and in a position exposed to the head wind for free swinging movement about a vertical axis, said fin having its center of air force and its center of mass both disposed to the rear of the vertical axis.

3. In a vehicle, the combination with a steering mechanism, of a vehicle body and a vertical fin pivotally carried by the body and in a position exposed to the head wind for free swinging movement about a vertical axis, said fin having its center of air force and its center of mass both disposed to the rear of the vertical axis, the fin being disposed wholly within the longitudinal bounds of the vehicle body.

4. In a vehicle, the combination with a steering mechanism, of a vehicle body and a vertical fin pivotally carried by the body and in a position exposed to the head wind for free swinging movement about a vertical axis, said fin having its center of air force and its center of mass both disposed to the rear of the vertical axis, the fin being disposed wholly within the longitudinal bounds of the vehicle body, and means for limiting swinging movement of the fin to confine it within the lateral bounds of the vehicle body.

5. In a vehicle, the combination with a steering mechanism, of a vehicle body and a vertical fin pivotally carried by the body above the center of mass thereof and in a position exposed to the head wind for free swinging movement about a vertical axis, said fin having its center of air force and its center of mass both disposed to the rear of the vertical axis, the center of air force of the fin being disposed substantially vertically above the center of mass of the vehicle body.

6. In a vehicle, in combination, a vehicle body and a stabilizing fin mounted on the vehicle body with provision for free rotation about a vertical axis, the fin extending for a substantial distance in advance of the axis but having its center of air force disposed sufficiently behind the axis to cause the fin normally to point into the head wind, and having its center of mass disposed sufficiently behind the axis to cause the fin, when the vehicle rounds a turn, to turn relatively to the vehicle in the direction that the vehicle is turning.

7. In a vehicle, the combination with a vehicle body, of a plurality of stabilizing fins carried by the body above the center of mass thereof and free to turn about spaced vertical axes, and means inter-connecting the fins to compel them to turn in unison.

8. In a vehicle, the combination with a vehicle body, of a plurality of stabilizing fins carried by the body above the center of mass thereof and free to turn about spaced vertical axes, means inter-connecting the fins to compel them to turn in unison, and a weight carried by the inter-connecting means and centrifugally operated to render the fins effective to apply a moment to the vehicle body, when the vehicle rounds a turn, that opposes the centrifugal force acting on the body.

9. In a vehicle, the combination with a vehicle body, of a frame comprising a pair of spaced fins, a cross member rigidly connecting the fins, means carried by the body and supporting the frame for movement about a vertical axis located substantially midway between the fins, said frame having the center of mass thereof located behind said axis, and spring means opposing swinging of the frame out of parallelism with the longitudinal axis of the vehicle body.

10. In a vehicle, the combination with a vehicle body, of an aerofoil structure pivotally carried by the body for movement about a vertical axis and centrifugally operated, when the vehicle rounds a turn, into position to utilize the head wind for applying a moment to the body that opposes the centrifugal force acting on the body, and spring means opposing movement of the aerofoil structure out of substantial parallelism with the longitudinal axis of the vehicle.

HARVEY W. BELL.